US006638604B1

(12) United States Patent
Bamberg et al.

(10) Patent No.: US 6,638,604 B1
(45) Date of Patent: Oct. 28, 2003

(54) INK JET TRANSFER SYSTEMS, PROCESS FOR PRODUCING THE SAME AND THEIR USE IN A PRINTING PROCESS

(75) Inventors: Ulf Bamberg, Jestetten (DE); Peter Kummer, Neunkirch (CH); Ilona Stiburek, Zürich (CH)

(73) Assignee: Arkwright Incorporated, Fiskeville, RI (US)

( * ) Notice: Subject to any disclaimer, the term of this patent is extended or adjusted under 35 U.S.C. 154(b) by 0 days.

(21) Appl. No.: 09/341,279

(22) PCT Filed: Jan. 6, 1998

(86) PCT No.: PCT/IB98/00004

§ 371 (c)(1), (2), (4) Date: Aug. 20, 1999

(87) PCT Pub. No.: WO98/30749

PCT Pub. Date: Jul. 16, 1998

(30) Foreign Application Priority Data

Jan. 10, 1997 (CH) ........................................ 49/97

(51) Int. Cl.[7] ..................... B32B 27/14; B32B 3/00

(52) U.S. Cl. .................... 428/195; 428/206; 428/211; 428/327; 428/474.4; 428/914

(58) Field of Search ........................... 428/195, 206, 428/211, 327, 914, 474.4

(56) References Cited

U.S. PATENT DOCUMENTS

| | | | | | |
|---|---|---|---|---|---|
| 4,767,420 | A | | 8/1988 | Mehl et al. | 8/470 |
| 4,853,706 | A | * | 8/1989 | Van Brimer et al. | 346/1.1 |
| 4,999,076 | A | * | 3/1991 | Incremona et al. | 156/241 |
| 5,188,032 | A | * | 2/1993 | Lewis et al. | 101/453 |
| 5,242,739 | A | | 9/1993 | Kronzer et al. | 428/200 |
| 5,455,326 | A | * | 10/1995 | Parker | 528/335 |
| 5,487,614 | A | | 1/1996 | Hale | 400/120.02 |
| 5,501,902 | A | | 3/1996 | Kronzer | 428/323 |
| 5,611,881 | A | * | 3/1997 | Kimura et al. | 156/241 |
| 5,798,179 | A | * | 8/1998 | Krozner | 428/411.1 |
| 5,834,154 | A | * | 11/1998 | Yamazaki et al. | 430/201 |
| 5,877,796 | A | * | 3/1999 | Tsuchiya et al. | 347/105 |
| 6,080,261 | A | * | 6/2000 | Popat et al. | 156/240 |
| 6,113,725 | A | * | 9/2000 | Kronzer | 156/230 |
| 6,200,668 | B1 | * | 3/2001 | Kronzer | 428/195 |
| 6,200,676 | B1 | * | 3/2001 | Matsubara et al. | 428/341 |

FOREIGN PATENT DOCUMENTS

| | | | |
|---|---|---|---|
| EP | 0 227 245 | A2 | 7/1987 |
| EP | 0 524 635 | A1 | 1/1993 |
| EP | 0 649 753 | A1 | 4/1995 |
| EP | 0 661 168 | A2 | 7/1995 |
| GB | 2 189 436 | A | 10/1987 |

* cited by examiner

*Primary Examiner*—Bruce H. Hess
*Assistant Examiner*—B. Shewareged
(74) *Attorney, Agent, or Firm*—Barlow, Josephs & Holmes, Ltd.

(57) ABSTRACT

It is described an ink-jet transfer system or transfer print respectively, having a high degree of washproofness and unfadeability as well as good ecological properties, as well as a process for its preparation and its use for a printing process by means of the ink-jet transfer system according to the invention.

The inventive ink-jet transfer system comprises a carrier material, a hot-melt layer being applied onto said carrier material and at least one ink-receiving layer whereby the at least one ink-receiving layer comprises a mixture of a high porous pigment and of a binder, whereby the molecules of the pigment and optionally of the binder and optionally of the hot-melt are capable to form chemical bonds with the ink-dyestuff molecules.

10 Claims, No Drawings

INK JET TRANSFER SYSTEMS, PROCESS FOR PRODUCING THE SAME AND THEIR USE IN A PRINTING PROCESS

CROSS-REFERENCE TO RELATED APPLICATIONS

This application claims the priority of the Swiss application No. 49/97 having been filed on Jan. 10, 1997, the disclosure of which is incorporated herein by reference in its entirety.

TECHNICAL FIELD

The invention relates to an ink-jet transfer system or an ink-jet transfer print, respectively.

BACKGROUND ART

Transfer prints enjoy a considerable popularity, as they allow the application of any graphic presentation, patterns, images or typing, notably on clothes like T-shirts, sweatshirts, shirts or any other textile substrate like for instance mouse-pads. Of particular interest are ink-jet transfer systems (ink-jet transfer prints), providing the potential users with the possibility of an individual selection of electronically obtainable graphic presentations which could be down-loaded by a computer and which could eventually be printed or pressed with an iron onto the desired clothing piece or any other textile substrate (support) by the user himself. Thereby, in a first step, the desired, electronically obtained picture is produced by the user of the transfer print upon using a computer, said print is transmitted from the computer to a suitable printer e.g. an ink-jet printer, which on its turn is printing the desired picture onto the transfer system. The transfer print thus prepared has to display a texture allowing for the further use to print it onto a textile substrate. By means of a suitable transfer print, the desired graphic presentation is brought to adhesion onto the desired textile substrate. Usually, graphic presentations are applied through a hot print and optionally through a prior cold print onto the desired textile substrate.

In recent years, considerable efforts have been undertaken in order to improve the hot transfer systems as well as the printing of the desired graphic presentations onto the textile substrate with a satisfactory quality.

For instance, U.S. Pat. No. 5,242,739 describes a heat-sensitive transfer paper which is capable to fix an image, comprising the following components: (a) a flexible cellulose containing, unwoven, textile-like paper displaying a superior and an inferior surface and (b) a melting transfer-film layer being capable to receive an image, which is situated onto the superior surface of the paper substrate, (c) as well as optionally an intermediary hot-melt layer. The film layer consists to about 15 to 80 weight-% of a film-forming binder and to about 85 to 20 weight-% of powder-like thermoplastic polymer, whereby the film-forming binder and the thermoplastic polymer do show a melting point of between about 65° C. and 180° C.

U.S. Pat. No. 5,501,902 represents a further development of U.S. Pat. No. 5,242,739, which equally consists of a two-layer system, whereby however, in order to improve the printing image, a viscosity agent for ink is further contained.

Furthermore, within the transfer prints of U.S. Pat. No. 5,501,902 there is preferably a cationic, thermoplastic polymer contained in order to improve the ink-absorbency capacity.

Pigments for receiving the ink material being mentioned by the prior art are usually polyesters, polyethylene wax, ethylen-vinylacetate-copolymers, whereas binders being mentioned are polyacrylates, styrene-vinylacetate copolymers, nitrile rubber, polyvinylchloride, polyvinylacetate, ethylene acrylate copolymers and melamine resins.

The known ink-jet transfer systems are quite successful in respect of their capacity to transfer well-resolved images onto textile substrates, however, with regard to their unfadeability or washproofness they are quite unsatisfactory. Although any graphic presentation could be printed e.g. onto a clothing piece, in an adequate quality, said presentations are washed out rather easily so that the color is fading quite rapidly. Furthermore, a whole series of commercially available products (containing PVC or melamine resins) do release toxic compounds during the iron pressing procedure, for example allyle chloride or formaldehyde and are therefore rather questionable from the ecological point of view as well as in view of public health.

Disclosure of the Invention

It was therefore an objective of the present invention to provide an ink-jet transfer system which notably avoids the above-mentioned drawbacks concerning the unsatisfactory unfadeability or the washproofness and furthermore which is ecologically advantageous.

It was furthermore an object of the present invention to provide a method for the manufacture of ink-jet transfer systems having a considerably unfadeability or washproofness.

Finally, it was an objective of the present invention to provide a printing process, whereby by means of ink-jet transfer systems, high quality graphic presentations and high unfadeability or washproofness can be printed onto textile substrates.

The above-mentioned objectives have been resolved according to the independent claims. Preferred embodiments are mentioned within the dependent claims.

The ink-jet transfer systems according to the present invention comprise a carrier material, a hot-melt layer which is on said hot-melt layer and at least one ink-receiving layer which is on said hot-melt layer, whereby the at least one ink-receiving layer contains a mixture of a highly porous pigment and a binder, whereby the molecules of the highly porous pigments and optionally of the binder and, optionally, of the hot-melt layer are capable to form essentially chemical bonds to the dyestuff molecules of the ink. While with conventional ink-jet transfer systems, the corresponding dyestuff agents—as a result of the printing onto the textile substrate for instance by iron pressing—are primarily bonded in a mechanical way, the dyestuff molecules of the ink according to the present invention are bonded through chemical bonds onto the molecules of the pigments and of the binder and optionally of the hot-melt. This is inventively achieved through the fact that the molecules of the pigments and optionally of the binder and optionally of the hot-melt dispose of reactive groups that are capable to form chemical bonds with the also reactive groups of the dyestuff molecules of the ink.

The hot-melt layer which is directly on said carrier material is a wax-like polymer, can be easily molten and can therefore be transferred to the textile substrate together with the imprinted ink-receiving layer onto the textile substrate through, for instance, iron pressing, and eventually the carrier layer, can be removed. It is the hot-melt layer which, owing to its wax-like properties, reinforces the adhesion to the textile substrate in the first place.

The ink-receiving layer (ink-layer) is situated on the hot-melt layer and primarily comprises a highly porous pigment and a binder. The highly porous pigment serves in the first place to the mechanic absorbency of the ink during the printing of the desired graphic presentation, whereby the maximum porosity guarantees a particularly high absorbency. The binders are necessary, so to fix the highly porous pigments onto the product surfaces and thus enabling the further processing (the printing) of the ink-jet transfer system.

The chemical bonds between the dyestuff molecules of the ink and the molecules of the pigments as well as the binders are, among others, formed upon providing energy, for instance by means of the iron pressing of the ink-jet transfer system according to the invention onto the textile substrate.

For the printing of the ink-jet transfer system, for instance through an ink-jet printer, commercially usual acid dyestuffs, e.g. azo dyestuffs according to formula I are used.

(I)

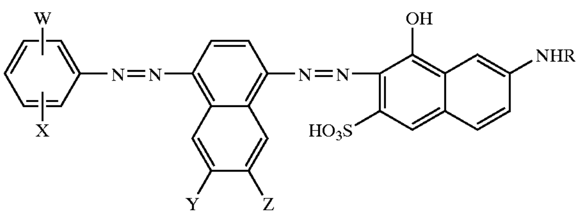

W = COOH
X = H or COOH
Y & Z = H, COOH or $SO_3H$
R = H, $CH_2COOH$ or $CH_2CH_2COOH$

The ink dyestuff molecules are primarily in an anionic form in solution and also dispose of reactive groups which allow the formation of chemical bonds with reactive groups of pigment molecules as well as optionally the binder molecules. The reactive groups are basically one or more sulfonate groups or carboxylate groups per dyestuff molecule. Under suitable conditions, for instance through heating during the iron pressing of the ink-jet transfer system onto the textile substrate, chemical or rather ionic bonds or intermediary valence bonds between sulfonate groups and carboxylate groups and the reactive groups e.g. amino groups, of the pigments or binders could be formed, whereby the dyestuff molecules are fixed in a chemical way, thus forming for instance sulfonamides (—$SO_2$NH—R) or amide groupings (—CONH—R) or the rather amphotheric $SO_3^-$ $NH_3^+$—R groups.

An example is the poly[1,2-bis(amino-methylcyclohexyl) ethane-adipic amid] of formula (II) which, owing to its terminal amino groups, generates chemical bonds (sulfonamid groupings or carboxylic amid groupings) upon reacting with acid groups of an azo dyestuff.

Ways to Execute the Invention

In a preferred embodiment the ink-receiving layer of the inventive ink-jet transfer system consists of a highly porous pigment and a binder, whereby at least one of both components, in particular the pigment being present in bigger amounts, disposes of reactive amino groups that are capable to form chemical bonds to the dyestuff molecules of the liquid ink.

In a particularly preferred embodiment of the present invention, the ink-receiving layer comprises a highly porous polyamide pigment and a binder consisting of a soluble polyamide, whereby the terminal, free amino groups of the polyamide pigment and of the polyamide binder are capable to fix reactive groups, e.g. sulfonate groups or carboxylate groups of the dyestuff molecules. Thereby, through both the pigment components as well as through the binder component, a chemical fixation of the dyestuff molecules could be achieved.

Further to the inventive requirement regarding the ability to form chemical bonds between the dyestuff molecules of the ink and the molecules of the pigments as well as the binder, the ink-jet transfer system according to the present invention has to display a big absorbency, or ink-receiving capacity, so to guarantee a well-resolved printed image. This requirement is achieved by providing a pigment preferably a polyamide pigment having a high porosity.

The selection of the preferred polyamide pigment is quite crucial, as it has turned out that the degree of porosity of the polyamide pigment influences in a decisive way the ink-receiving capacity of the ink-jet transfer system.

The polyamide pigments that are used for the ink-jet transfer systems according to the present invention preferably display a spherical, for instance a globular, geometry and a maximum interior surface. The granular size of the inventively used polyamide pigments is within a scope of about 5 $\mu$m and about 45 $\mu$m, whereby a scope of 5 to 20 $\mu$m is particularly preferred. The bigger the granular size of the polyamide pigment, the more said surface of said pigment is closed, thereby reducing or even rendering impossible the ink-receiving capacity. The interior surface of the highly porous pigment amounts to at least about 15 $m^2/g$, preferably it is between about 20–30 $m^2/g$.

It turned out that in particular a polyamide pigment having the trade designation in "Orgasol" displays the required properties, in particular in view of the high porosity.

A highly porous polyamide pigment with an inferior surface of at least about 15 $m^2/g$ and a granular size of between about 5 $\mu$m and about 45 $\mu$m is obtained trough anionic polyaddition and a subsequent controlled precipitation process. In contrast to the conventional methods, whereby a polyamide condensation product, e.g. as a granulate is prepared which is then crushed, the inventive polyamide pigments are actually grown, and said growth of the pigments is ceased upon reaching the desired granular size. 85–95% of the polyamide pigments thus obtained, show the desired form and granular size, whereby only a maximum of 15% do have a smaller or bigger granular size.

(II)

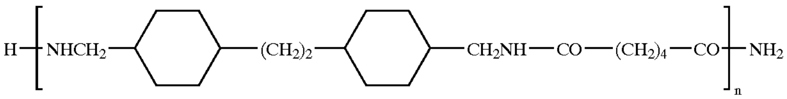

For an ink-receiving layer with highly porous polyamides being used as pigments, the binder is preferably a polyamide as well. The polyamide used as a binder is different from the polyamide pigment, concerning its properties in as far as it is employed as a solution and thereby does not have to comply with specific requirements. The use of a polyamide as binder is therefore less crucial. Said polyamide has only to be soluble in a suitable solvent, for instance alcohol or a mixture of alcohol-water, and preferably it should have free terminal amino groups allowing for fixation with dyestuff molecules, e.g. sulfone groups of azo-dyestuff or ester groups.

The ratio of the highly porous pigment and the binder within said ink-receiving layer of the inventive ink-jet transfer system, amounts to about between 5:1 and 1:1, preferably 3:1 and 2:1 and particularly preferred 2.4:1.

The hot-melt layer within the ink-jet transfer system is directly on said removable carrier material and serves to transferring the graphic presentation imprinted through the ink-jet plotter onto the textile substrate. Said transfer is, for instance, effected through a cold print, i.e. through iron pressing, cooling down and removing the carrier layer. Through the iron pressing, the hot-melt layer is molten in the first place, which transfers then the ink-receiving layer—being imprinted by the ink-jet plotter—to the textile substrate so to form the transfer system. Thereby, the space between the pigment—and binder particles are filled first by molten hot-melt, until the pigment is then also more or less molten. Unlike the highly porous pigment and the binder, the hot-melt is rather wax-like, i.e. it can be more easily molten. Usually, hot-melts do melt within a scope of about 100–120° C., while the highly porous pigments do preferably display a scope of about 120–180° C., preferably of 140–160° C. where they melt. A usual hot-melt is for instance an ethylene acrylic acid copolymer dispersion.

Particularly preferred, though, are those hot-melts, which on their side, dispose of reactive groups for the fixation of ink-dyestuff molecules. Thus, even more dyestuff could be bonded, so to allow for an adjustment of a high washproofness, i.e. the washproofness and unfadeability of the printed graphic presentation is particularly good. It is therefore preferred to use a hot-melt consisting of the polyethylene copolymer with a polyamide moiety.

Further additives can be present within the ink-jet transfer system according to the present invention, however, upon using such additives, it has to be paid attention that their use does not deteriorate the washproofness of the eventually obtained transfer print. For procedural reasons, it is for instance reasonable to use a dispersing additive for organic pigments to prepare the inventive ink-jet transfer system.

As a carrier material for the cold print, any separating paper can be used, preferably a heat resisting paper, e.g. a silicon paper, can be used. For the hot print, however, preferably normal paper is used.

Further to the ink-jet transfer system itself, an additional aspect of the present invention is the process for its preparation. The coating method comprises the following steps:

a) application of a hot-melt layer onto a carrier material, for instance silicon paper, through a coating means, for instance a coating machine, whereby a layer thickness of about 30 to 40 μm is adjusted, thereafter drying of the hot-melt layer, and b) application of a first ink-receiving layer dispersion onto said hot-melt layer, and optionally c) application of a second and optionally any further ink receiving layer dispersion onto the first ink-receiving layer, so that the total thickness of the layer of the ink-receiving layer of about 20–35 μm is achieved, d) drying of the ink-jet transfer system.

The double/multiple application of an ink-receiving layer provides the advantage of yielding a smooth and even surface, as well as an ink-receiving layer having a balanced thickness, thus influencing the printing process or the resulting print image in a positive way.

The graphic presentation to be applied onto the textile substrate is printed reverse side through a usual printer, e.g. an ink-jet printer (ink-jet-plotter) and afterwards it is iron pressed onto the desired textile substrate, for instance T-shirt at a temperature of between about 150 to 220° C., preferably about 190° C. for at least 10 seconds. The carrier material forms the supreme layer, which is removed subsequent to the application of the graphic presentation and preferably after the cooling down and is thereafter discarded (cold print). A heat-resisting silicon paper is used as a preferred carrier material. The printed graphic presentation obtained in such a way (cold print) is smooth and shining.

Thereafter, it is preferred to carry out a hot-print, in order to improve the washproofness, the respiratory activity of the cold imprinted and sealed textile substrate. Furthermore, the hot-print removes any undesired shining and suppresses the fading-away of the dyestuff material upon washing. Therefore, normal white paper or paper being siliconized on one side, the silicon side onto the cold printed textile substrate, is iron pressed with the already printed graphic presentation at a temperature being sufficient to melt the hot-melt for about 10 seconds and is then removed rapidly. Thus, the printed layer obtained by the cold print is microscopically roughened and the textile fibers are better penetrated by the wax-like mixture consisting of the printed hot-melt and ink-receiving layer, well through the cold print there is primarily a film-like surface adhesion only.

In the following, the present invention shall be illustrated by two examples whereby said examples are not to be construed as limiting the scope of protection.

EXAMPLE 1

Preparation of an Ink-jet Transfer System

In a first step, the hot-melt layer is applied onto the carrier material: Thereby, a silicon paper having a thickness of 0.1 mm is coated with an ethylene copolymer being mixed with polyamide in a ratio of 60:40, thus providing a thickness of 30 μm.

The ink-receiving layer has been prepared in the meantime: an ethanol/water mix having a ratio of 3:1 is forwarded and a soluble polyamide binder is dissolved therein upon heating to 45° C. Thereafter, the highly porous polyamide pigment "Orgasol 3501 EX D NAT1" of a granular size of 10 μm, as well as an interior surface of about 25 $m^2/g$ is dispersed into the solution.

In order to stabilize the dispersion, a dispersing additive for organic pigments and being commercialized by the Coatex Company under the product designation COADIS 123K, is introduced and the dispersion is stirred for about 10 minutes at room temperature.

Onto said solid hot-melt layer, the dispersion containing the ink-receiving layer is applied within two steps. In the first step a thickness of 15 μm and in a second step a thickness of 10 μm is applied, whereby a total thickness of the ink receiving layer of 25 μm is achieved.

Finally, the solvent is evaporated, so to obtain solid ink-receiving layer on which a desired graphic presentation could be printed through an ink-jet plotter.

The desired films could be cut into any form following to the corresponding requirements.

EXAMPLE 2

Use of an Ink-jet Transfer System for Printing

The ink-jet transfer system obtained by example 1 is used in order to print a graphic presentation on a T-shirt. Thereby, in a first step the desired electronically obtainable and storable graphic presentation is printed by means of a computer through an ink-jet plotter in a reverse-side way onto said paper having been obtained as an ink-jet transfer system according to example 1.

Thereafter, said print is put onto desired part of the selected T-shirt by its colored side and is pressed trough a hot iron (temperature of about 190° C.) for about 10 seconds. Thereafter, the T-shirt thus obtained, is cooled down to room temperature and the carrier material, i.e. the silicon paper is removed. The image thus obtained is shining and smooth.

In a next step, a normal white sheet of paper is applied onto said print and is again pressed for about 10 seconds at a temperature of about 190° C. Without cooling down, the paper is continuously and rapidly removed without any tearing. Through said hot print the flexibility is reinforced, a better washability and a complete respiratory activity as well as a pleasant touch is achieved.

While there are shown and described presently preferred embodiments of the invention, it is to be distinctly to understood that the invention is not limited thereto but may be otherwise variously embodied and practiced within the scope of the following claims.

What is claimed is:

1. An ink-jet transfer system comprising a silicon paper carrier material, a hot-melt layer being applied onto said carrier material and at least one ink-receiving layer being applied over the hot-melt layer, wherein the at least one ink-receiving layer comprises a mixture of a porous polyamide pigment having a surface area of at least 15 $m^2$/g and an average granular size from 5 to 45 $\mu$m, and a polyamide binder.

2. The ink-jet transfer system according to claim 1, wherein the molecules of the pigment are capable of forming chemical bonds to ink dyestuff molecules.

3. The ink-jet transfer system according to claim 1, wherein the porous polyamide pigment has a surface area from 20 $m^2$/g to 30 $m^2$/g.

4. The ink-jet transfer system according to claim 1, wherein the porous polyamide pigment has an average granular size from 5 $\mu$m to 20 $\mu$m.

5. The ink-jet transfer system according to claim 1, wherein the ratio between the porous polyamide pigment and the polyamide binder is from about 5:1 to 1:1.

6. The ink-jet transfer system according to claim 1, wherein the hot-melt layer comprises a mixture comprising a blend of ethylene acrylic acid copolymer and a polyamide having reactive terminal amino groups.

7. The ink-jet transfer system according to claim 1, wherein the silicon paper carrier material is a heat resistant separating paper.

8. The ink-jet transfer system according to claim 1, wherein the ink-receiving layer comprises a dispersing additive for organic pigments.

9. The ink-jet transfer system according to claim 5, wherein the ratio between the porous polyamide pigment and the polyamide binder is from about 3:1 to 2:1.

10. The ink-jet transfer system according to claim 5, wherein the ratio between the porous polyamide pigment and the polyamide binder is about 2.4:1.

* * * * *